Nov. 24, 1931.  H. G. HOSE  1,833,421
TOY
Filed May 31, 1930  2 Sheets-Sheet 1
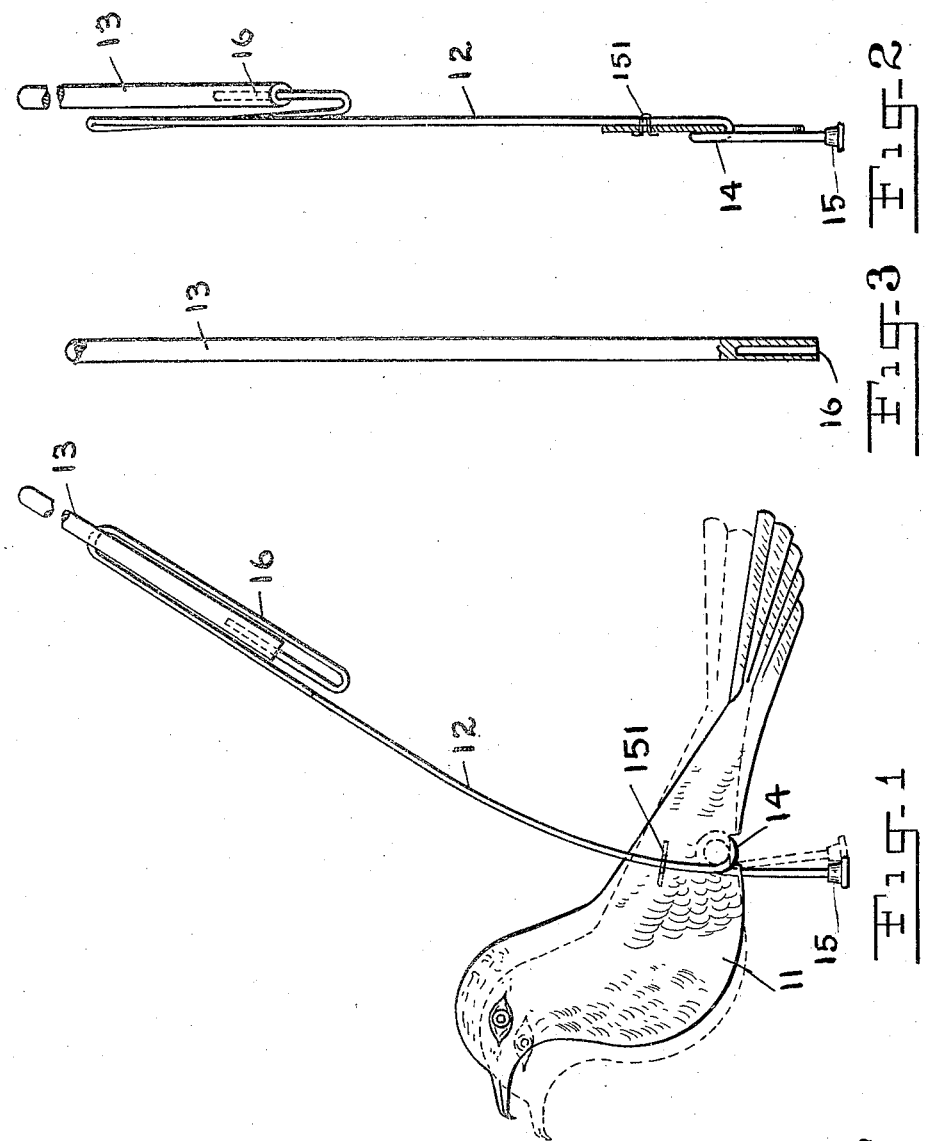
Inventor:
Henry Gowen Hose
By his Attorneys
Edmond Conger Brown
Elizabeth C. Brown.

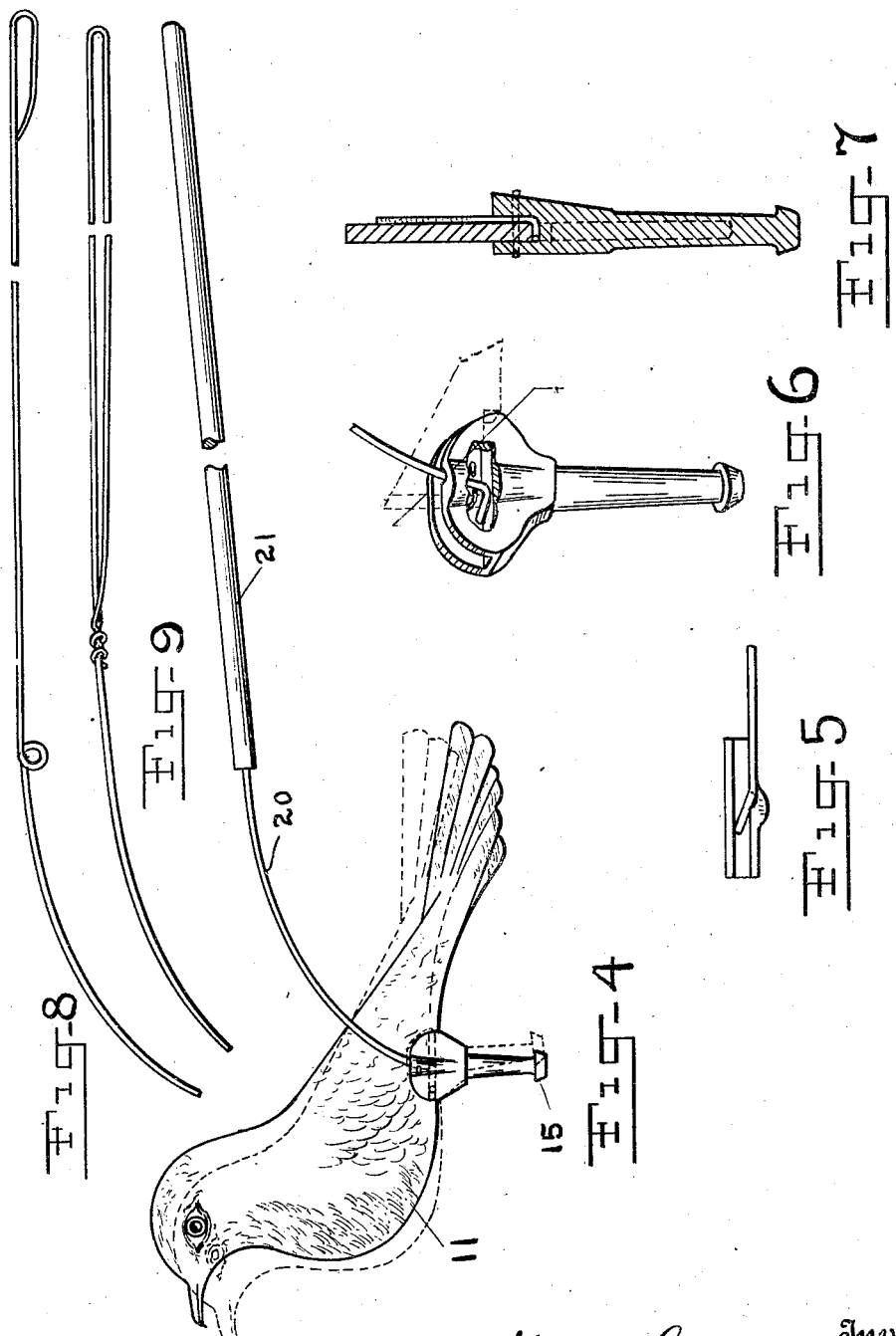

Patented Nov. 24, 1931

1,833,421

UNITED STATES PATENT OFFICE

HENRY GOWER HOSE, OF PORT CHESTER, NEW YORK

TOY

Application filed May 31, 1930. Serial No. 458,107.

The invention relates to toys for the amusement of children and such others as may be interested, and more particularly the invention relates to devices simulating a bird or other animal which normally progresses, when traveling over the ground, by a series of hops or jumps, the invention also comprising, in combination with the said representation of a bird, members connected therewith serving as a manipulating or operating handle and constructed so as to bring about a jumping or hopping motion when the bird is moved along the ground.

One of the principal objects of the invention is to provide a toy of the character described which shall be capable of exhibiting an amusing motion of a regular, intermittent, jerking character, as above described, simulating the movement of a bird over the ground, that is to say, a motion consisting of a series of hops or jumps. Further objects and advantages of the invention will be in part set forth in the following specification and in part will be obvious therefrom without being specifically pointed out, the same being realized and attained by means of the instrumentalities and combinations pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in this specification.

In the accompanying drawings,

Fig. 1 is a side view of one embodiment of my invention, the handle proper being broken away;

Fig. 2 is a front view, partly in section, of the invention, the handle also being broken away;

Fig. 3 is a view of the handle proper, the lower part being in section to show the socket formed therein;

Fig. 4 is a side view of another embodiment of my invention;

Figs. 5, 6 and 7 are detail views of parts of the same, as hereinafter described; and Figs. 8 and 9 are modified forms of handle, as hereinafter described.

In carrying my invention into effect in the embodiment thereof shown in Figs. 1, 2 and 3, it will be seen (referring more particularly to Fig. 1) that I provide a figure composed of cardboard, thin wood, or the like, in the shape of a bird, the same being painted or otherwise decorated so as to simulate a bird, the same being designated 11. In connection with this device 11, I employ a handle comprising two members, a wire member of which the main part is designated 12 in the drawings, and a wooden member or handle proper, designated 13. The wire member is, in the embodiment of the invention now under description, formed into a peculiar shape, which can best be seen by an examination of Figs. 1 and 2, a coil or kink 14 being formed in the wire near its lower end, in which the edge of the member 11 is inserted, as clearly shown in Fig. 2, thus securely holding the body of the bird to the member 12. The parts are further secured together by means of a staple or the like, as shown at 151 in Fig. 2. The wire member 12 is provided at its lower end with a foot 15, which is preferably of rubber or some suitable material adapted to engage with the ground over which the bird is made to hop. The wire member 12 is extended upwards in a curved form, as shown in Fig. 1, and is then bent backwards upon itself and then upwards again, and the extreme upwardly extending end is inserted in a socket 16 in the lower end of the wooden handle 13.

In the embodiment of the invention shown in Figs. 4, 5, 6 and 7, I provide a figure of a bird of the same general appearance as that already described, in the other embodiment of the invention, but a somewhat different form of handle and a somewhat different method of attaching the handle and the bird together are shown in the present embodiment. Here the bird is designated, as before, 11. I provide a wire handle 20, the upper end of which is connected with a wooden handle 21, analogous to the handle 13 in the previously described embodiment of the invention, the lower end of which wire 20 is connected to the bird by means of the device which is shown in Figs. 5, 6 and 7, the construction and method of assembling of which will be obvious without specific description.

In Figs. 8 and 9, I show modified forms of handle for the device, the construction and operation of which will be obvious from an inspection of the drawings.

The operation of the invention will be obvious from what has been said above with regard to its construction. It may be merely briefly remarked that the handle 13 or 21, or the wire handle if such is employed, as represented in Figs. 8 and 9, is grasped in the hand, the rubber foot at the bottom of the downwardly extending member 12 is placed upon the ground, and a forward push given to the handle. The result is that the device assumes the position shown in the dotted lines in Fig. 1 or Fig. 4, and, owing to the adhesion of the foot 15 to the ground, and as the push increases, this dotted line position is accentuated, until the resiliency of the wire member overcomes the friction of the foot upon the ground, and the device then gives a jump or hop into the former position, shown in full lines, which motion simulates in a humorous way the jumping or hopping motion of a bird upon the ground.

The advantages of the invention will be obvious without special description thereof.

I do not limit myself to any of the exact forms of the invention which are here shown and described, as it is obvious that various modifications of the same may be made without departing from the spirit and scope of the invention.

Having thus described my invention, what I claim as new and desire to secure by Letters Patent is as follows:

1. An amusement device comprising in combination the following elements and parts: a member simulating a living animal, a handle adapted to be held in the hand for operating the device, and a resilient member immovably secured to said animal-simulating member and extending downward therefrom and simulating a foot therefor and adapted to enter into intermittent frictional engagement with the ground.

2. An amusement device comprising in combination the following elements and parts: a member simulating a living animal, a handle adapted to be held in the hand for operating the device, and a semi-rigid member immovably secured to said animal-simulating member and extending downward therefrom and simulating a foot therefor and adapted to enter into intermittent frictional engagement with the ground.

3. An amusement device comprising in combination the following elements and parts: a member simulating a living animal, a handle adapted to be held in the hand for operating the device, a resilient connection between said handle and said animal-simulating member, and a resilient member immovably secured to said animal-simulating member and extending downward therefrom and simulating a foot therefor and adapted to enter into intermittent frictional engagement with the ground.

4. An amusement device comprising in combination the following elements and parts: a member simulating a living animal, a handle adapted to be held in the hand for operating the device, a semi-rigid connection between said handle and said animal-simulating member, and a semi-rigid member immovably secured to said animal-simulating member and extending downward therefrom and simulating a foot therefor and adapted to enter into intermittent frictional engagement with the ground.

5. A device as set forth in claim 3, wherein the resilient connection between the handle and the animal-simulating member comprises a loop whereby the resiliency of the same is increased.

6. A device as set forth in claim 3, wherein the downwardly extending foot-simulating member is provided with a frictional terminal member.

In witness whereof I have hereunto signed my name this 29th day of May, 1930.

HENRY GOWER HOSE.